United States Patent
Stephens et al.

(10) Patent No.: US 9,426,624 B2
(45) Date of Patent: Aug. 23, 2016

(54) PROVIDING LOCATION INFORMATION FOR EXPRESSIONS

(71) Applicant: QUALCOMM Incorporated, San Diego, CA (US)

(72) Inventors: Arthur Stephens, Georgetown, TX (US); Michaela Vanderveen, Tracy, CA (US); Vincent Douglas Park, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 14/264,904

(22) Filed: Apr. 29, 2014

(65) Prior Publication Data

US 2015/0312718 A1     Oct. 29, 2015

(51) Int. Cl.
| | | |
|---|---|---|
| *H04W 4/02* | (2009.01) | |
| *H04W 8/00* | (2009.01) | |
| *H04W 4/00* | (2009.01) | |
| *H04L 29/08* | (2006.01) | |
| *H04W 4/20* | (2009.01) | |

(52) U.S. Cl.
CPC .............. *H04W 4/025* (2013.01); *H04L 67/16* (2013.01); *H04L 67/18* (2013.01); *H04W 4/008* (2013.01); *H04W 4/02* (2013.01); *H04W 4/20* (2013.01); *H04W 8/005* (2013.01)

(58) Field of Classification Search
CPC ..... H04W 4/025; H04W 4/008; H04W 8/005; H04W 76/023
See application file for complete search history.

(56) References Cited

U.S. PATENT DOCUMENTS

| | | | |
|---|---|---|---|
| 8,195,817 B2 | 6/2012 | Xue et al. | |
| 2005/0152283 A1* | 7/2005 | Ritzenthaler | 370/254 |
| 2008/0037487 A1* | 2/2008 | Li et al. | 370/338 |
| 2010/0057485 A1* | 3/2010 | Luft | 705/1 |
| 2010/0254308 A1* | 10/2010 | Laroia et al. | 370/328 |
| 2011/0039592 A1* | 2/2011 | Haddad et al. | 455/515 |
| 2013/0145165 A1 | 6/2013 | Brown et al. | |
| 2013/0259231 A1* | 10/2013 | Wang et al. | 380/270 |

(Continued)

FOREIGN PATENT DOCUMENTS

| | | |
|---|---|---|
| WO | WO-2009048740 A1 | 4/2009 |
| WO | WO-2013112953 A1 | 8/2013 |

OTHER PUBLICATIONS

3GPP, "3rd Generation Partnership Project; Technical Specification Group Services and System Aspects; Study on architecture enhancements to support Proximity-based Services (ProSe), Release 12," 3GPP TR 23.703, v12.0.0 (Feb. 2014), Technical Report, Feb. 2014, 324 pgs., retrieved from the Internet: URL: http://www.3gpp.org/ftp/tsg_sa/WG2_Arch/Latest_SA2_Specs/Rel-12/, 3rd Generation Partnership Project.

(Continued)

*Primary Examiner* — Nathan Mitchell
(74) *Attorney, Agent, or Firm* — Holland & Hart LLP

(57) ABSTRACT

Methods, apparatuses and systems are described for conveying location information from an announcing user device to a listening user device engaged in ProSe discovery communications. The announcing user device may use a first expression to broadcast an initial announcement, and then use a second expression to broadcast the location of the announcing user device. The first expression may be in the form of a public expression while the second expression may be in the form of a private expression.

30 Claims, 11 Drawing Sheets

(56) References Cited

U.S. PATENT DOCUMENTS

| | | |
|---|---|---|
| 2013/0288668 A1 | 10/2013 | Pragada et al. |
| 2013/0336227 A1 | 12/2013 | Cho et al. |
| 2014/0010108 A1* | 1/2014 | Tavildar et al. ............... 370/254 |
| 2014/0029471 A1* | 1/2014 | Tavildar et al. ............... 370/255 |
| 2014/0073321 A1* | 3/2014 | Kuusilinna et al. ........... 455/434 |
| 2014/0162688 A1* | 6/2014 | Edge .......................... 455/456.1 |
| 2014/0256262 A1* | 9/2014 | Park et al. .................... 455/41.2 |
| 2014/0295832 A1* | 10/2014 | Ryu et al. ...................... 455/434 |
| 2015/0049635 A1* | 2/2015 | Lee ............................... 370/254 |
| 2015/0049674 A1* | 2/2015 | Kuo .............................. 370/328 |
| 2015/0172902 A1* | 6/2015 | Kasslin et al. |
| 2015/0192658 A1* | 7/2015 | Ullah et al. |
| 2015/0208226 A1* | 7/2015 | Kuusilinna et al. |
| 2015/0230076 A1* | 8/2015 | Hedman et al. |

OTHER PUBLICATIONS

ISA/EPO, International Search Report and Written Opinion of the International Searching Authority, Int'l App. No. PCT/US2015/022949, Jul. 27, 2015, European Patent Office, Rijswijk, NL, 12 pgs.

* cited by examiner

PROVIDING LOCATION INFORMATION FOR EXPRESSIONS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Generally, a wireless multiple-access communications system may include a number of base stations, each simultaneously supporting communication for multiple user devices. Base stations may communicate with devices on downstream and upstream links. Each base station has a coverage range, which may be referred to as the coverage area of the base station or cell.

Devices (i.e., user equipment (UEs)) that are proximate to each other may also communicate directly via device-to-device (D2D) or proximity based service (ProSe) communication. As part of ProSe discovery, an announcing device may broadcast one or more services that the device can offer to other proximate devices. Listening devices can receive the broadcast announcement and determine whether the announced services can be used by the listening device. In deciding whether to use the advertised services, the listening device may benefit from knowing the location of the announcing device. However, because resources allocated for ProSe discovery communications are restricted, the announcing device may not be able to broadcast its location in the same resources as its announcement.

SUMMARY

The described features generally relate to one or more improved methods, systems, or apparatuses for managing wireless communications. The improved methods include conveying location information from an announcing user device to a listening user device engaged in ProSe discovery. While the announcing user device may use a public expression to broadcast a service announcement, the announcing user device may use a private expression to also convey its location information.

In a first set of illustrative embodiments, a method of wireless communication may include broadcasting, from a user device, a first expression using proximity services (ProSe) discovery communications, the first expression including a first announcement of services. The method may also include broadcasting, from the user device, a second expression using ProSe discovery communications, the second expression including location information relating to the user device and being identifiable through use of the first expression. The first expression may be a public expression and the second expression may be a private expression. The second expression may be selectively broadcast based at least in part on an amount of movement of the user device. For example, the method may include transmitting the location information to an expression metadata server for association with the first announcement if the amount of movement of the user device is below a predetermined threshold.

In some aspects, an identifier may be included in the second expression. The identifier may relate to the first announcement. Therefore, the method may include generating the identifier, and transmitting the identifier to an expression metadata server for association with the first announcement. Alternatively, the method may include transmitting a request to an expression metadata server to generate the identifier and to associate the identifier with the first announcement. The identifier may be included in a first portion of the second expression and the location information may included in a second portion of the second expression.

In some aspects, the method may further include generating a first hash of one or more portions of the first expression, and including the first hash in the second expression. The first hash may be included in a first portion of the second expression, and the location information may be included in a second portion of the second expression. The method may further include broadcasting, from the user device, a third expression using ProSe discovery communications, the third expression including a second announcement of services, generating a second hash of one or more portions of the third expression, and including the second hash in the second expression. The first and the second hash may be included in a first portion of the second expression, and the location information may be included in a second portion of the second expression. At least one of the first and second hashes may be truncated.

In a second set of illustrative embodiments, an apparatus for wireless communication may include means for broadcasting, from a user device, a first expression using proximity services (ProSe) discovery communications, the first expression including a first announcement of services. The apparatus may also include means for broadcasting, from the user device, a second expression using ProSe discovery communications, the second expression including location information relating to the user device and being identifiable through use of the first expression. The first expression may be a public expression and the second expression may be a private expression.

In some aspects, the apparatus may further include means for including an identifier in the second expression, the identifier relating to the first announcement. In one example, the apparatus may further include means for generating the identifier, and means for transmitting the identifier to an expression metadata server for association with the first announcement. In an alternative example, the apparatus may include means for transmitting a request to an expression metadata server to generate the identifier and to associate the identifier with the first announcement. The identifier may be included as a prefix in the second expression and the location information may be included as a suffix in the second expression.

In some aspects, the apparatus may further include means for generating a first hash of one or more portions of the first expression, and means for including the first hash in the second expression. The first hash may be included in a first portion of the second expression, and the location information may be included in a second portion of the second expression. The apparatus may further include means for broadcasting, from the user device, a third expression using ProSe discovery communications, the third expression including a second announcement of services, means for generating a second hash of one or more portions of the third expression, and means for including the second hash in the second expression. The first and the second hash may be included in a first portion of the second expression, and the location information may be included in a second portion of the second expression.

In a third set of illustrative embodiments, an apparatus configured for wireless communication may include at least one processor and a memory coupled to the at least one processor. The at least one processor may be configured to broadcast, from a user device, a first expression using proximity services (ProSe) discovery communications, the first expression including a first announcement of services. The at least one processor may also be configured to broadcast, from the user device, a second expression using ProSe discovery communications, the second expression including location information relating to the user device and being identifiable through use of the first expression.

In a fourth set of illustrative embodiments, a method of wireless communication may include receiving, from a user device, a first expression using proximity services (ProSe) discovery communications, the first expression including an announcement of services, and receiving, from the user device, a second expression using ProSe discovery communications, the second expression being identifiable through use of the first expression. The method may also include determining a location of the user device from the second expression.

In some aspects, the method may further include communicating with an expression metadata server to receive an identifier associated with the announcement, and associating the second expression with the first expression by identifying the identifier as a portion of the second expression. The identifier may be included in a first portion of the second expression and the location of the user device may be included in a second portion of the second expression.

In other aspects, the method may further include generating a hash of one or more portions of the first expression, and associating the second expression with the first expression by identifying the hash as a portion of the second expression. The hash may be included in a first portion of the second expression, and the location of the user device may be included in a second portion of the second expression. The method may further include truncating the hash, wherein the second expression may be associated with the first expression by identifying the truncated hash as a portion of the second expression.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
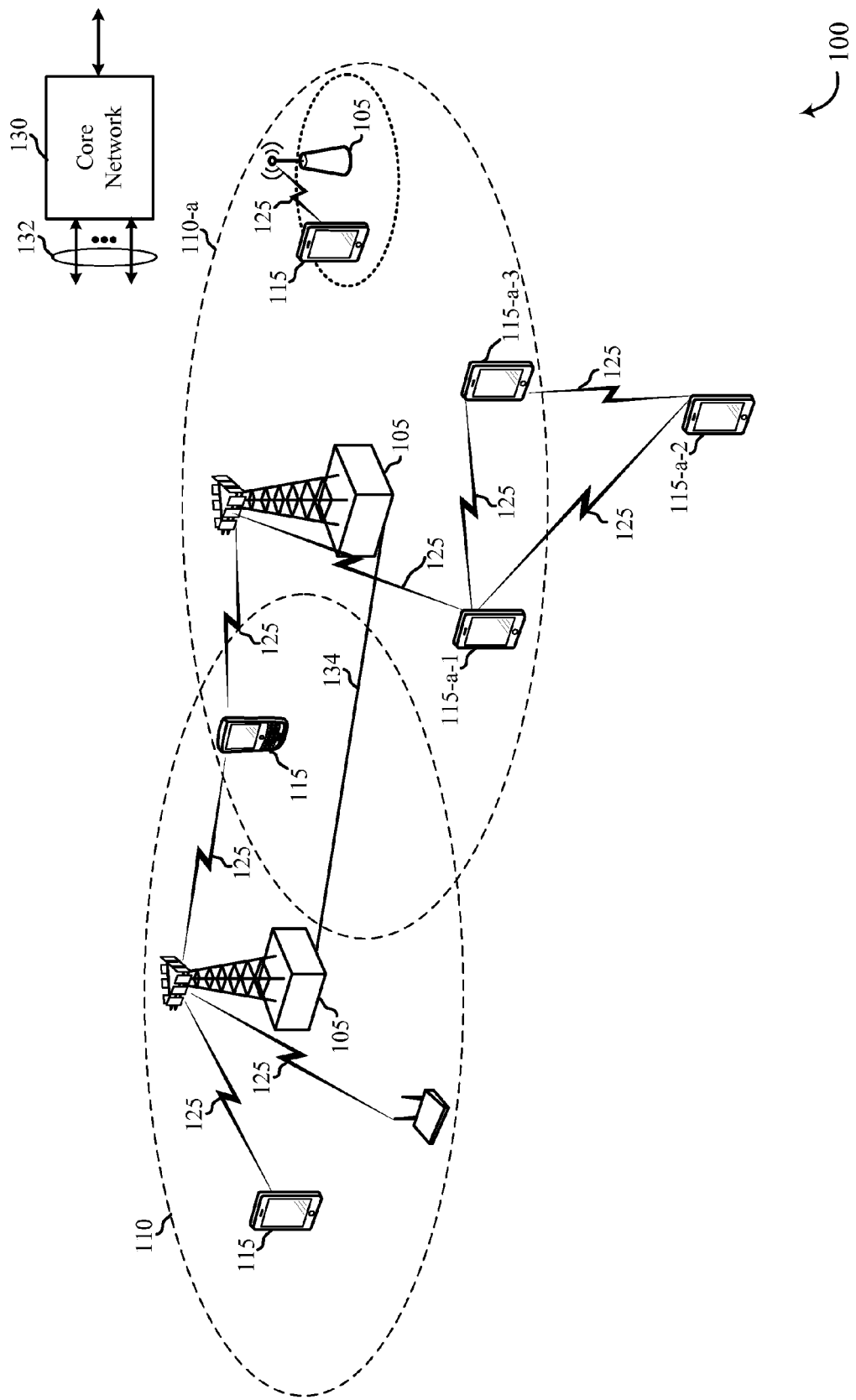
FIG. 1 is a block diagram of an example of a wireless communications system.

Typically, devices (i.e., user equipment (UEs)) engage in wireless communication by communicating with a base station of a wireless communications system. However, these devices may also participate in direct D2D or ProSe wireless communications. ProSe communication allows UEs that are within range of each other to communicate directly with each other instead of communicating through a base station. An example of when ProSe wireless communication is desirable is when a UE intends to have a communication session with other UEs in close proximity, or just be visible to other UEs in the same location. An announcing UE may broadcast a ProSe discovery announcement, such as a Direct Peer-Discovery Signal in a Long Term Evolution (LTE) system, which may then be received by a listening UE in the proximity that is monitoring such discovery communications. The announcing UE may include a code such as a ProSe discovery application code in the over-the-air (OTA) discovery announcement message. The ProSe discovery application code may indicate the desired intent or function of the announcing UE. A listening UE may receive the ProSe discovery announcement with its ProSe discovery application code, and can then determine whether the listening UE is present nearby and is potentially also available to engage in ProSe communications with the announcing UE.

Additionally, a listening UE may benefit from receiving a specific location of the advertised services and/or announcing UE. However, because of bandwidth limitations, specific location information of an announcing device has not generally been broadcast by the announcing device. The message format and resources allocated for an announcing device's announcement do not allow sufficient resources for inclusion of the location information with the announcement. Instead, an announcing UE may transmit specific location information to a database on a server accessible to other listening UEs. There, the specific location information may be stored as metadata associated with the announcing UE's announcement. Once a listening UE has received an announcement, the listening UE may then access the database to receive additional information that pertains to the announcing UE, including the location of the announcing UE.

However, if the announcing user device is moving, this system may require a significant number of transmissions and queries by both the announcing and the listening UEs to the shared database. The high number of transmissions and queries can result in network overload and power-drain and other side-effects within the UEs. Therefore, alternative systems for conveying location information that result in fewer communications with the shared database may be beneficial for at least the reason that power-drain of the participating UEs may be reduced.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some embodiments, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, or pico base stations). There may be overlapping coverage areas for different technologies.

In embodiments, the system 100 is an LTE/LTE-A network. In LTE/LTE-A networks, the terms evolved Node B (eNB) and user equipment (UE) may be generally used to describe the base stations 105 and UEs 115, respectively. The system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro eNB, for example. A base station for a pico cell may be referred to as a pico eNB. And, a base station for a femto cell may be referred to as a femto eNB or a home eNB. A base station may support one or multiple (e.g., two, three, four, and the like) cells.

The core network 130 may communicate with the base stations 105 via backhaul links 132 (e.g., S1, etc.). The base stations 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Base stations 105 may also communicate information and commands to UEs 115. For example, when a UE 115 enters into a connected mode with a base station 105, the base station 105 and UE 115 mutually authenticate each other. Once authenticated, the base station 105 may securely communicate information to the UE 115. UEs 115 may additionally communicate with the core network 130 via base stations 105.

The UEs 115 are dispersed throughout the wireless communications system 100, and each UE may be stationary or mobile. A UE 115 may also be referred to by those skilled in the art as a user device, a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. A UE 115-a may also communicate directly with another UE 115 via ProSe wireless communications. In one example, a UE 115-a-1 within a coverage area 110-a of a base station 105 may serve as a relay for UE 115-a-2 that is outside the coverage area 110-a of the base station 105. The in-coverage UE 115-a-1 may relay (or retransmit) communications from the base station 105 to the out-of-coverage UE 115-a-2. Similarly, the in-coverage UE 115-a-1 may relay communications from the out-of-coverage UE 115-a-2 to the base station 105. Additionally, ProSe wireless communication may occur between UEs 115 that are each in-coverage and may occur for many different reasons. Thus, in-coverage UE 115-a-1 may engage in ProSe wireless communication with in-coverage UE 115-a-3. UE 115-a-3 may also engage in ProSe wireless communication with UE 115-a-2.

In order for a UE 115 to participate in ProSe wireless communication, the UE 115 may first participate in ProSe discovery. ProSe discovery allows UEs 115 to discover other UEs. ProSe discovery includes an announcing UE that broadcasts a ProSe discovery announcement, and a listening UE that monitors for ProSe discovery announcements. A listening UE may receive a ProSe discovery announcement and may then respond and engage in communications with the announcing UE, either via ProSe direct communications or via the network. In addition, a listening UE may benefit from a knowledge of the announcing UE's specific location, without any need for communication. Therefore, methods for acquiring the announcing UE's location information are beneficial and are explained below.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. The communication links 125 may also include ProSe messages (including ProSe discovery messages) exchanged between UEs 115.

Figure 2:
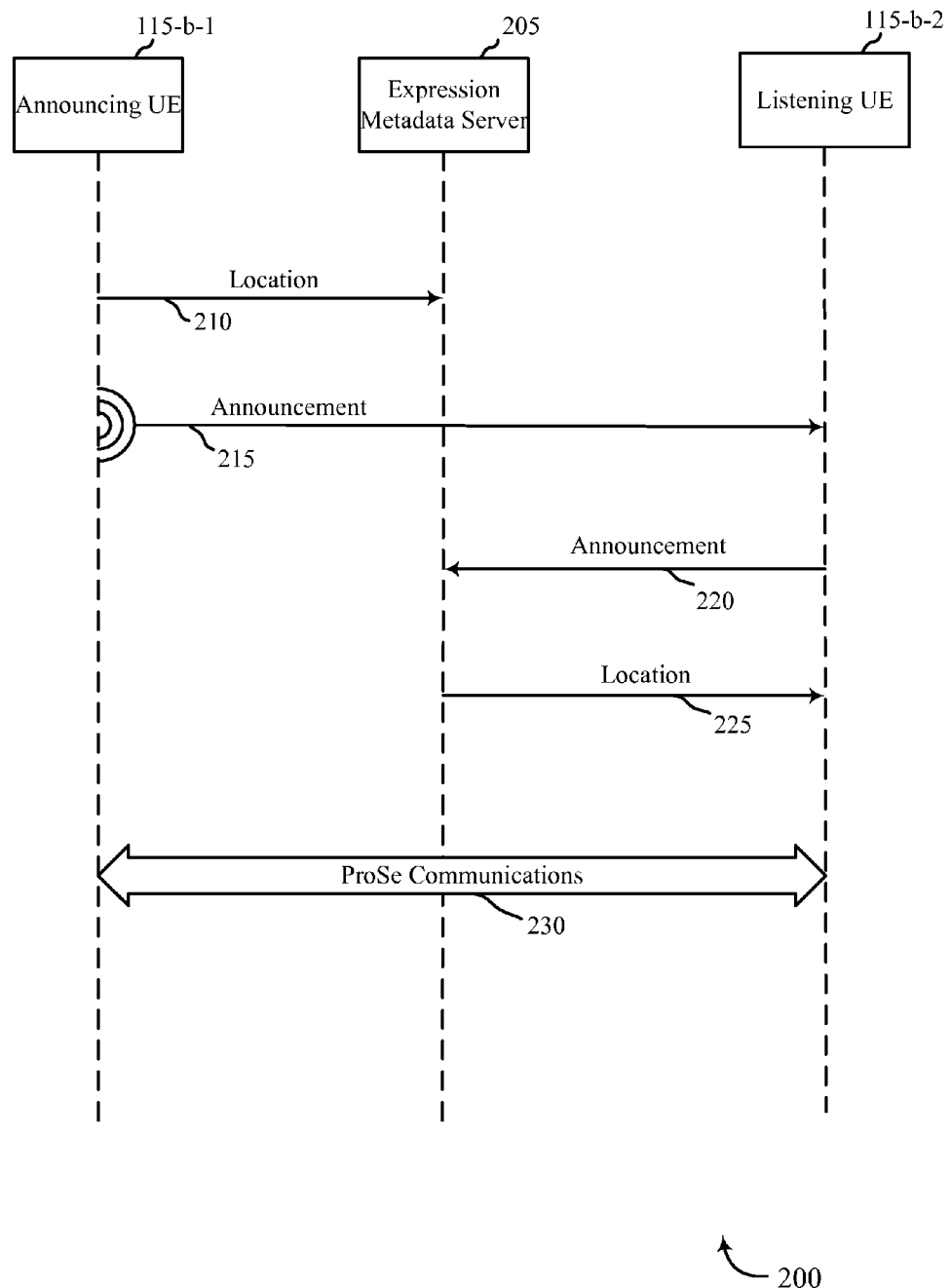
FIG. 2 is a message flow diagram illustrating communications between user devices engaged in ProSe communication and an expression metadata server, in accordance with various embodiments.

FIG. 2 is a message flow diagram 200 illustrating one method by which a listening UE 115-b-2 may acquire a location of an announcing UE 115-b-1. The UEs may be examples of the UEs 115 described with respect to FIG. 1. In diagram 200, the UEs also exchange communications with an expression metadata server 205. The expression metadata server 205 may be a component of the core network 130, also illustrated in FIG. 1.

In one configuration, an announcing UE 115-b-1 may facilitate other listening UEs (e.g., listening UE 115-b-2) in acquiring the location of the announcing UE 115-b-1. To that end, the announcing UE 115-b-1 transmits a message 210 to an expression metadata server 205 that includes the announcing UE's location information. The message 210 may also include an identification that can be associated with the announcing UE's location, such as an identification of the announcing UE or an identification relating to the announcement. Using the received location information, the expression metadata server 205 may store the location information for the announcing UE in such a way so as to be accessible to other listening UEs, as explained below.

The announcing UE 115-b-1 may then transmit its announcement via message 215. Message 215 may be broadcast, multi-cast, or unicast via, for example, communication link 125 of FIG. 1. The message 215 may be received by one or more listening UEs such as listening UE 115-b-2. Message 215 may be a ProSe discovery announcement message and may thus indicate the announcing UE's announcement of services. Message 215 may also include, for example, an identification of the announcing UE 115-b-1 or a ProSe discovery application code corresponding to the announcement of services offered by the announcing UE 115-b-1. Message 215 may be in the form of a public expression, also sometimes referred to as open discovery code. As such, message 215 may be received and understood by any listening UE. This is in contrast with private expressions, which require some prior exchange of information in order to be understood.

In one configuration, a listening UE 115-b-2 receives the message 215, which includes the announcing UE's announcement. However, the message 215 does not include the announcing UE's location. If the listening UE 115-b-2 is to acquire the location information for the announcing UE 115-b-1, the listening UE 115-b-2 may transmit a message 220 to the expression metadata server 205. The message 220 may include the announcement received from the announcing UE 115-b-1 via message 215, or some other data that can be used to inform the expression metadata server 205 that the listening UE is searching for information pertaining to the received service announcement. Using the data transmitted in message 220, the expression metadata server 205 can identify the announcing UE's location information, as uploaded by the announcing UE 115-b-1 via message 210. The expression metadata server 205 can then transmit the desired location information to the listening UE 115-b-2 via message 225. In this way, the listening UE 115-b-2 can ascertain the location of the announcing UE 115-b-1. If desired, the listening UE 115-b-2 and the announcing UE 115-b-1 may engage in ProSe communications 230.

The diagram 200 represents one method for conveying location information to a listening UE 115-b-2. However, as explained above, if the announcing UE 115-b-1 is moving, the system illustrated in diagram 200 could require that the announcing UE 115-b-1 submit a significant number of messages 210 over time to the expression metadata server 205 in order to update the expression metadata server 205 with current location information. Thus, the system illustrated in diagram 200 may be improved upon.

Figure 3:
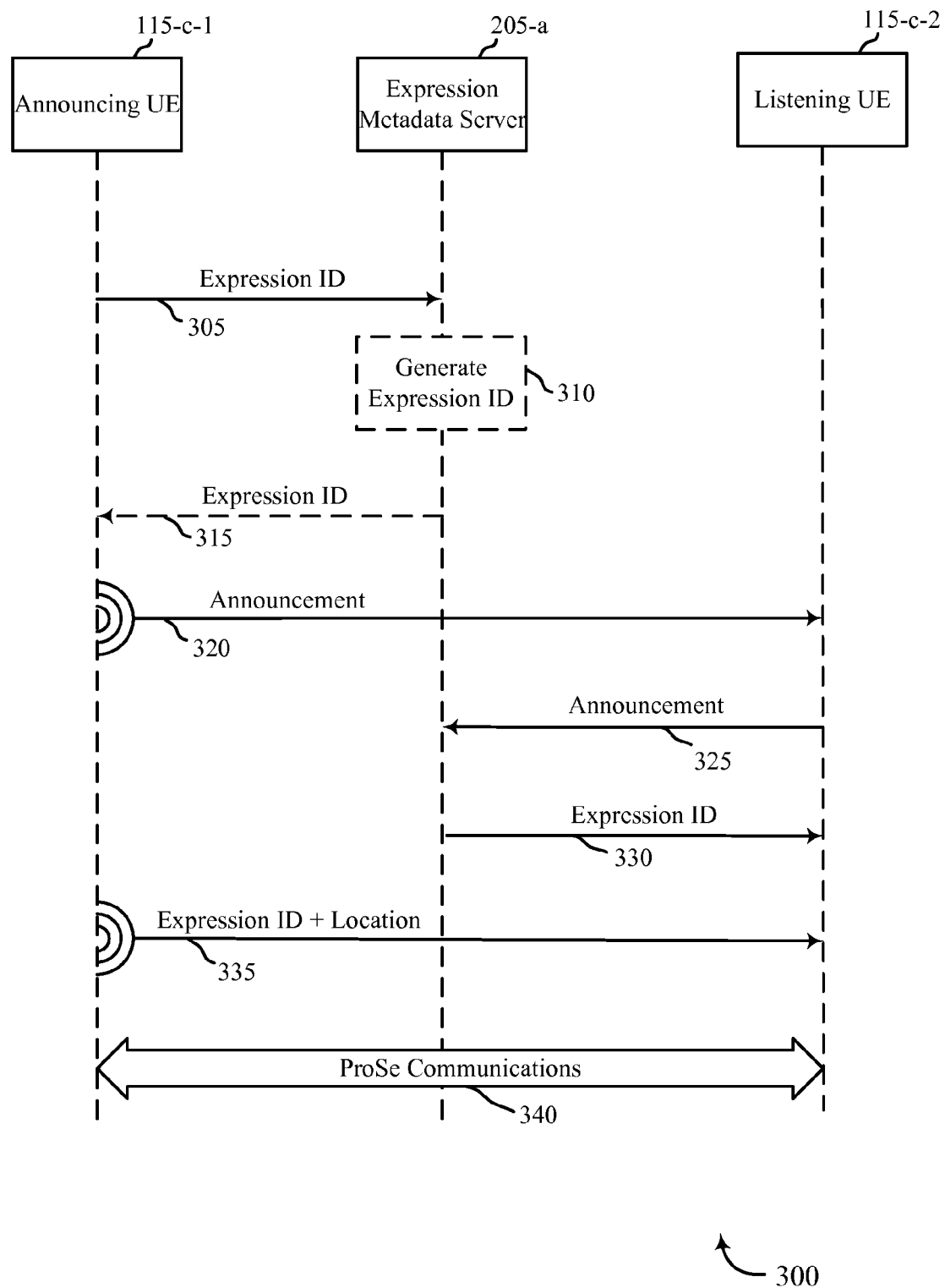
FIG. 3 is a message flow diagram illustrating communications between user devices engaged in ProSe communication and an expression metadata server, in accordance with various embodiments.

FIG. 3 is a message flow diagram 300 illustrating a method by which a listening UE 115-c-2 may acquire a location of an announcing UE 115-c-1 when the announcing UE 115-c-1 is in motion. The UEs may be examples of the UEs 115 described with respect to FIG. 1. In diagram 300, the UEs also exchange communications with an expression metadata server 205-a. The expression metadata server 205-a may be a component of the core network 130, also illustrated in FIG. 1.

The system illustrated via diagram 300 may be used by an announcing UE 115-c-1 when the announcing UE 115-c-1 is in motion. An announcing UE may be determined to be in motion if its motion with respect to some other object (one that is either stationary or in motion) is greater than a predetermined threshold.

In one configuration, an announcing UE 115-c-1 may facilitate other listening UEs (e.g., listening UE 115-c-2) in acquiring the location of the announcing UE 115-c-1. To that end, the announcing UE 115-c-1 transmits a message 305 to an expression metadata server 205-a that includes an announcement or an identification associated with the announcing UE's announcement of services. The announcement and/or associated data may be transmitted to the expression metadata server 205-a so that it may be stored and associated with a separate expression ID. The expression ID may be used to identify an expression transmitted by the announcing UE 115-c-1 that includes the announcing UE's location information. The expression identified by the expression ID is separate from the expression broadcast by the announcing UE 115-c-1 that includes an announcement of services. Thus, as the announcing UE 115-c-1 may transmit two separate expressions (one including the announcement of services and one including the announcing UE's location information), the expression ID allows the location-bearing expression to be linked or associated with the announcement-bearing expression. In one embodiment, the expression ID may be generated by the announcing UE 115-c-1 and transmitted to the expression metadata server 205-a via message 305. In another embodiment, the expression metadata server 205-a may instead generate the expression ID (depicted at box 310) and then return the expression ID to the announcing UE 115-c-1 via message 315. In either embodiment, both the announcing UE 115-c-1 and the expression metadata server 205-a are in possession of the expression ID. In either embodiment, the expression metadata server 205-a stores and associates the expression ID with the announcement received from the announcing UE 115-c-1 via message 305.

The announcing UE 115-c-1 may then transmit its announcement via message 320. Message 320 may be broadcast, multi-cast, or unicast via, for example, communication link 125 of FIG. 1. The message 320 may be received by one or more listening UEs such as listening UE 115-*c*-2. Message 320 may be a ProSe discovery announcement message and thus may include the announcing UE's announcement of services. Message 320 may also include an identification of the announcing UE 115-*c*-1 or a ProSe discovery application code corresponding to the announcement of services offered by the announcing UE 115-*c*-1. Message 320 may be in the form of a public expression, also sometimes referred to as open discovery code. As such, message 320 may be received and understood by any listening UE.

In one configuration, a listening UE 115-*c*-2 receives the message 320, which includes the announcing UE's announcement. However, the message 320 does not include the announcing UE's location. If the listening UE 115-*c*-2 is to acquire the location information for the announcing UE 115-*c*-1, the listening UE 115-*c*-2 may transmit a message 325 to the expression metadata server 205-*a*. The message 325 may include the announcement received from the announcing UE 115-*c*-1 via message 320, or some other data that can be used to inform the expression metadata server 205 that the listening UE is searching for information pertaining to the received service announcement. Using the data transmitted in message 325, the expression metadata server 205-*a* can identify the associated expression ID, as either generated by the announcing UE 115-*c*-1 or the expression metadata server 205-*a*. The expression metadata server 205-*a* can then transmit the expression ID to the listening UE 115-*c*-2 via message 330.

In addition to broadcasting its announcement of services via message 320, the announcing UE 115-*c*-1 may also broadcast a message 335 that includes the announcing UE's location information. The broadcast of messages 320 and 335 may occur at approximately the same time. Message 335 may be broadcast, multi-cast, or unicast via, for example, communication link 125 of FIG. 1. The message 335 may be received by one or more listening UEs such as listening UE 115-*c*-2. Although FIG. 3 illustrates the receipt of the message 335 after receipt of the message 320, the messages may be received in any order. Message 335 may be in the form of a private expression, also sometimes referred to as restricted discovery code. As such, message 335 may only be understood by UEs that have been appropriately enabled.

Message 335 may include both the previously generated expression ID and the location information of the announcing UE 115-*c*-1. In one embodiment, the expression ID may be a prefix within message 335, while the location information may be a suffix within message 335. Other configurations may also be used as long as the configurations are known by all listening UEs. For example, the expression ID may be a suffix and the location information may be a prefix within message 335. Without knowledge of the expression ID, message 325 is not meaningful to a listening UE 115-*c*-2. However, because listening UE 115-*c*-2 has or will yet obtain the expression ID from the expression metadata server 205-*a*, the listening UE 115-*c*-2 may be enabled to understand the message 335. In other words, the listening UE 115-*c*-2 is able to use the expression ID to identify the message 335 and thus associate the location information included within message 335 with the announcing UE 115-*c*-1. If desired, the listening UE 115-*c*-2 and the announcing UE 115-*c*-1 may engage in ProSe communications 340.

Figure 4:
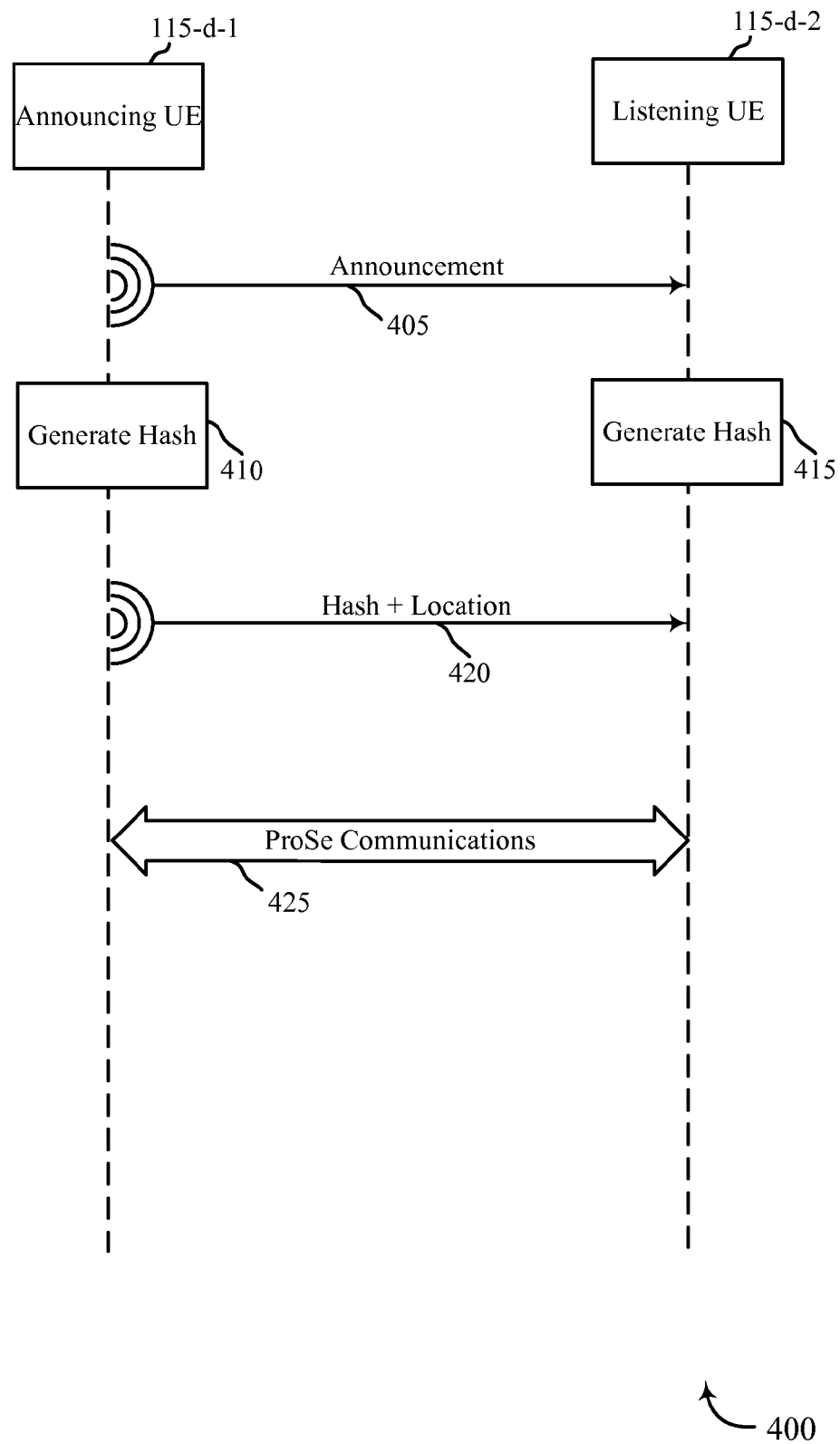
FIG. 4 is a message flow diagram illustrating data sent by a user device engaged in ProSe discovery, in accordance with various embodiments.

FIG. 4 illustrates yet another message flow diagram 400 depicting an additional method by which a listening UE 115-*d*-2 may acquire a location of an announcing UE 115-*d*-1. The UEs of diagram 400 may be examples of the UEs 115 described with respect to FIG. 1. In the method illustrated by diagram 400, expression metadata servers are not used to facilitate the exchange of location information.

In one configuration, an announcing UE 115-*d*-1 transmits an announcement via message 405. Message 405 may be broadcast, multi-cast, or unicast via, for example, via communication link 125 of FIG. 1. The message 405 may be received by one or more listening UEs such as listening UE 115-*d*-2. Message 405 may be a ProSe discovery announcement message and may include an announcement of services by the announcing UE 115-*d*-1. Message 405 may also include, for example, an identification of the announcing UE 115-*d*-1 or a ProSe discovery application code corresponding to the announcement of services offered by the announcing UE 115-*d*-1. Message 405 may be in the form of a public expression, also sometimes referred to as open discovery code. As such, message 405 may be received and understood by any listening UE.

In one configuration, a listening UE 115-*d*-2 receives the message 405, which includes the announcing UE's announcement and an ID. The message 405 does not, however, include the announcing UE's location. The location information may instead be included in a second message 420 transmitted by the announcing UE 115-*d*-1 and which may be uniquely identifiable.

In this embodiment, instead of generating an expression ID used to identify the message 420, a hash of at least portions of the message 405 is generated and used to identify the message 420. For example, using the data in the broadcast message 405, the announcing UE 115-*d*-1 may apply a well-known hash function to one or more portions of the message 405 to generate a hash (as depicted at box 410) which may then be included within a second message, message 420, that conveys the location of the announcing UE 115-*d*-1. The listening UE 115-*d*-2 may also use the same well-known hash function and apply it to the one or more portions of the message 405 transmitted by the announcing UE 115-*d*-1 and thus generate the same hash (as depicted at box 415) included by the announcing UE 115-*d*-1 in the message 420.

Message 420 may be broadcast by the announcing UE 115-*d*-1 and may include both the previously generated hash and the location information of the announcing UE 115-*d*-1. In one embodiment, the hash may be a prefix within message 420, while the location information may be a suffix within message 420. Other configurations may also be used as long as the configurations are known by all listening UEs. For example, the expression ID may be a suffix and the location information may be a prefix within message 335. Message 420 may be broadcast, multi-cast, or unicast via, for example, communication link 125 of FIG. 1. The broadcast of messages 405 and 420 may occur at approximately the same time. The message 420 may be received by one or more listening UEs such as listening UE 115-*d*-2. Although FIG. 4 illustrates the receipt of the message 420 after receipt of the message 405, the messages may be received in any order. Message 420 may be in the form of a private expression, also sometimes referred to as restricted discovery code. As such, message 420 may only be understood by UEs that have been appropriately enabled. In other words, without knowledge of the hash, message 420 is not meaningful to a listening UE 115-*d*-2. However, because listening UE 115-*d*-2 is able to determine the hash by applying the well-known hash function to one or more portions of the message 405, the listening UE 115-*d*-2 is enabled to understand the message 420. In other words, the listening UE 115-*d*-2 is able to use the hash to identify the message 420 and thus associate the location information included within message 420 with the announcing UE 115-

*d*-1. If desired, the listening UE 115-*d*-2 and the announcing UE 115-*d*-1 may engage in ProSe communications 425.

In some embodiments, an announcing UE 115-*d*-1 may broadcast multiple different messages 405, each including different announcements of available services. The different messages may then result in different corresponding hashes. Nevertheless, the announced services being made available by the announcing UE 115-*d*-1 all share the same location—that of the announcing UE 115-*d*-1. Therefore, in one embodiment, multiple different messages 420 may be transmitted by the announcing UE 115-*d*-1, each message 420 corresponding to different messages 405. However, in another embodiment, a single message 420 may be used to convey the location information corresponding to multiple messages 405. In this case, the single message 420 may include multiple hashes, each having been determined from a different message 405, and a single instance of the location information for the announcing UE 115-*d*-1. In some embodiments, the different hashes included within message 420 may need to be truncated and/or concatenated in order to ensure that more than one hash can fit within the resources allocated to message 420. The multiple hashes may be arranged within message 420 as a prefix, while the location information may be arranged as a suffix to message 420. Other configurations within message 420 may be used as well.

Figure 5:
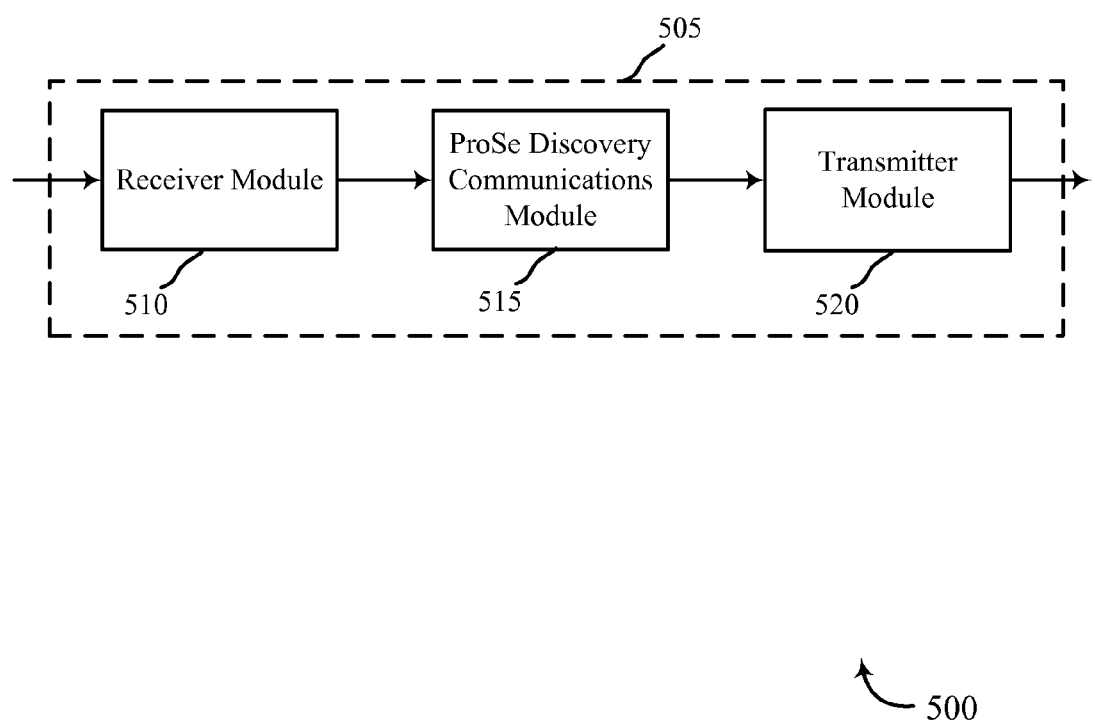
FIG. 5 is a block diagram of an example of an apparatus in accordance with various embodiments.

FIG. 5 is an example of a block diagram 500 of an apparatus 505 for use in wireless communication, in accordance with various aspects of the present disclosure. In some examples, the apparatus 505 may be an example of aspects of one or more of the UEs 115 described with reference to FIGS. 1, 2, 3 and/or 4, and may transmit and receive ProSe discovery messages in the form of public and private expressions, as explained above. The apparatus 505 may also be a processor. The apparatus 505 may include a receiver module 510, a ProSe discovery communications module 515, and/or a transmitter module 520. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIG. 1. The receiver module 510 may also be used to receive various types of ProSe discovery communications (i.e., transmissions) over one or more communication links of a wireless communication system, such as one or more communication links 125 of the wireless communication system 100 described with reference to FIG. 1. Examples of the types of ProSe discovery messages received by the receiver module 510 include the message 315 described with reference to FIG. 3, when the apparatus 505 is being used as an announcing UE. Examples of the types of ProSe discovery messages received by the receiver module 510 include the messages 215, 225, 320, 330, 335, 405 and/or 420 of FIGS. 2, 3, and/or 4, when the apparatus 505 is being used as a listening UE. ProSe messages may also be received by the receiver module 510, such as ProSe communication 230, 340 and/or 425 of FIGS. 2, 3 and/or 4.

In some examples, the transmitter module 520 may include at least one RF transmitter, such as at least one RF transmitter operable to transmit discovery messages. The transmitter module 520 may be used to transmit various types of ProSe discovery communications (i.e., transmissions) over one or more communication links of a wireless communication system, such as one or more communication links 125 of the wireless communication system 100 described with reference to FIG. 1. Examples of the types of ProSe discovery messages transmitted by the transmitter module 520 include the messages 210, 215, 305, 320, 335, 405 and/or 420 of FIGS. 2, 3, and/or 4, when the apparatus 505 is being used as an announcing UE. These messages may include both public and private expressions. Examples of the types of ProSe discovery messages transmitted by the transmitter module 520 include the messages 220 and/or 325 described with reference to FIGS. 2 and/or 3, when the apparatus 505 is being used as a listening UE. ProSe messages may also be transmitted by the transmitter module 520, such as ProSe communication 230, 340 and/or 425 of FIGS. 2, 3 and/or 4.

In some examples, the ProSe discovery communications module 515 may be used to manage the transmission of ProSe discovery communications via the receiver module 510 and/or the transmitter module 520. Managing the transmission and receipt of ProSe discovery communications may include broadcasting ProSe discovery announcements in the form of public expressions and also broadcasting location information in the form of private expressions. Managing ProSe discovery communications may also include receiving ProSe discovery announcements as well as receiving location information for an announcing UE. Communications between the apparatus 505 and an expression metadata server may also be coordinated through the ProSe discovery communications module 515.

Figure 6:
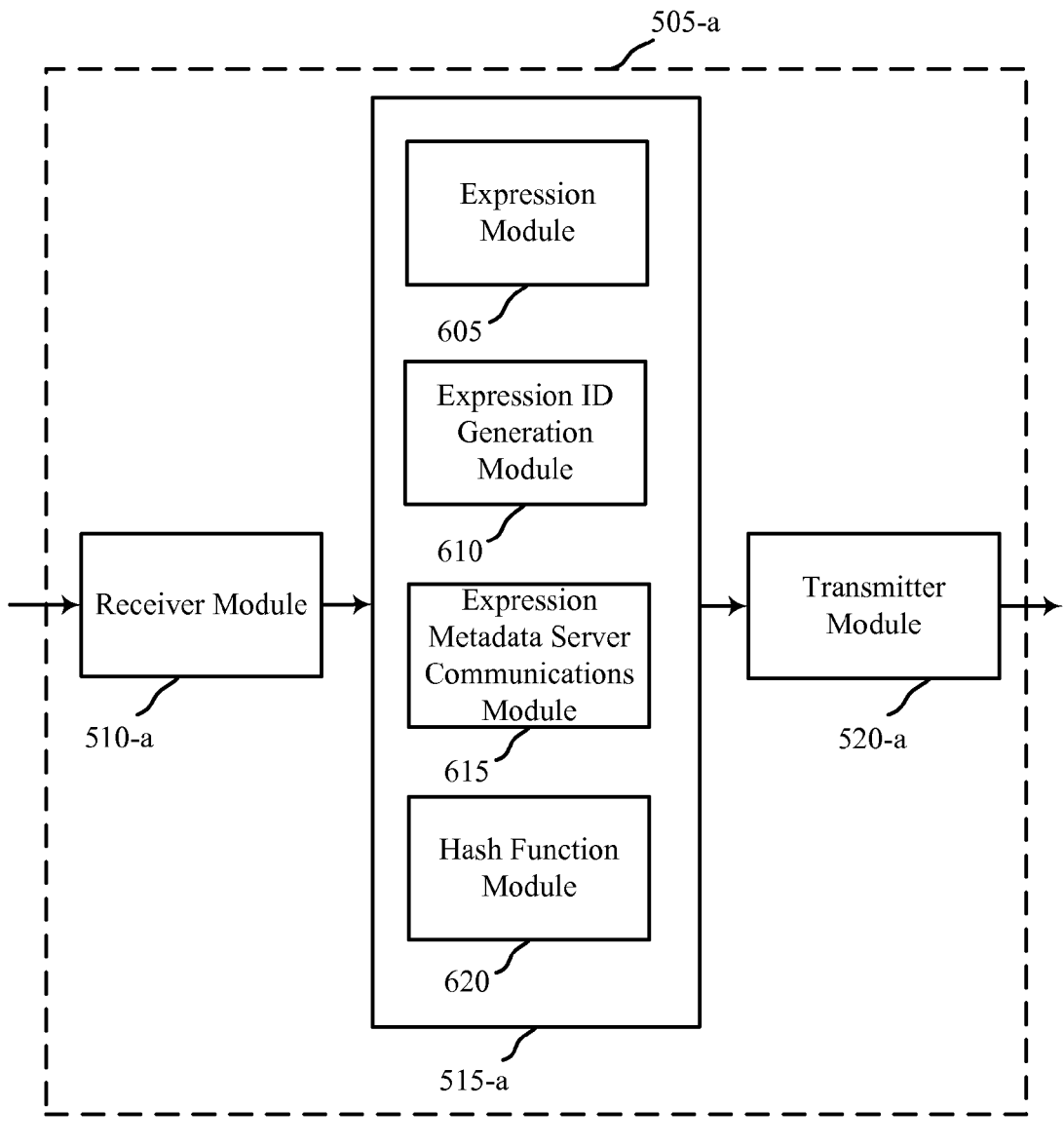
FIG. 6 is a block diagram of an example of an apparatus in accordance with various embodiments.

FIG. 6 shows a block diagram 600 that includes apparatus 505-*a*, which may be an example of one or more aspects of the apparatus 505 (of FIG. 5) for use in wireless communication, in accordance with various aspects of the present disclosure. In some examples, the apparatus 505-*a* may include a receiver module 510-*a* and a transmitter module 520-*a*, which may be examples of the receiver module 510 and transmitter module 520 of FIG. 5. In additional examples, the apparatus 505-*a* may include a ProSe discovery communications module 515-*a*, which may be an example of one or more aspects of the ProSe discovery communications module 515 of FIG. 5. In some examples, the ProSe discovery communications module 515-*a* may include an expression module 605, an expression ID generation module 610, an expression metadata server communications module 615, and/or a hash function module 620. The modules 605, 610, 615 and/or 620 may each be used in aspects of ProSe discovery communications, and, in particular, with the sending of location information for an announcing UE, and the receiving of location information for a listening UE, as described above with respect to FIGS. 2, 3 and/or 4. While FIG. 6 illustrates a specific example, the functions performed by each of the modules 605, 610, 615 and/or 620 may be combined or implemented in one or more other modules.

The expression module 605 may be used within an apparatus 505-*a* to generate, transmit and receive expressions related to ProSe discovery. In instances where apparatus 505-*a* is an announcing UE, the expression module 605 coordinates the generation and transmission of public and private expressions, such as messages 215, 320, 335, 405 and/or 420 of FIGS. 2, 3 and/or 4. In general, the generated and transmitted expressions include those that carry a ProSe discovery announcement. For example, an announcing UE may broadcast an announcement of services available through the announcing UE. The announcement may be included in a public expression so that any listening UE may receive and understand the announcement. The announcement may be included within the public expression in the form of a ProSe discovery application code that corresponds to the services offered by the announcing UE. Additionally, an identification of the announcing UE or of the announcement may be included in the public expression with the announcement. The expression module 605 may also generate and transmit expressions that include location information for the announcing UE. These expressions may be private expressions. The private expressions may include both the announcing UE's location as well as an identifier that may be used to associate the private expression with the public expression carrying the announcement. The identifier may be an expression ID, generated by either the announcing UE or an expression metadata server, or may be a hash of one or more portions of the public expression that includes the announcement. In some embodiments, when the announcing UE broadcasts multiple different public expressions having different announcements, the generated private expression includes multiple corresponding hashes as well as the location information of the announcing UE.

In instances where apparatus 505-*a* is a listening UE, the expression module 605 coordinates the receipt of public and private expressions, such as messages 215, 320, 335, 405 and/or 420 of FIGS. 2, 3 and/or 4. Receipt may be coordinated through, for example, the receiver module 510-*a*.

The expression ID generation module 610 may be used within an apparatus 505-*a* to generate an expression ID. In instances where apparatus 505-*a* is an announcing UE, the expression ID generation module 610 determines and/or generates an expression ID that can be used to uniquely identify a transmitted expression. For example, a private expression that conveys location information for an announcing UE may contain an expression ID. The expression ID may be included within the private expression and may also be made available to listening UEs so that listening UEs can associate the private expression with an announcing UE and its available services. The expression ID generation module 610 may generate a random expression ID or may use predefined algorithms to generate the expression ID. The expression ID itself need not have any substantive relation to the public expression or announcing UE with which it is associated, as long as the expression ID can be associated with the public expression. In other words, the expression ID need not be limited to any specific form or content.

The expression metadata server communications module 615 may be used within an apparatus 505-*a* to coordinate communications between the apparatus 505-*a* and an expression metadata server. An expression metadata server, such as illustrated and described with relation to FIGS. 2 and/or 3, is a server which stores or otherwise provides access to metadata relating to the expressions that are broadcast by an announcing UE during ProSe discovery. Thus, for example, an announcing UE may communicate with an expression metadata server to convey an expression ID or to receive an expression ID that may be associated with a broadcast public expression. A listening UE may, for example, communicate with an expression metadata server in order to associate a received public expression or announcement with an expression ID, thus allowing the listening UE to associate the received public expression or announcement with a private expression that includes the expression ID.

Thus, in instances where apparatus 505-*a* is an announcing UE, the expression metadata server communications module 615 coordinates the transmission or receipt of messages 210, 305 and/or 315 of FIGS. 2 and/or 3. The messages transmitted through the coordination of the expression metadata server communications module 615 generally include the announcement of services by the announcing UE or other data that allows for the identification of the announcement or of the announcing UE. The transmitted messages may also include the announcing UE's location, in the case of message 210, or an expression ID as generated by the expression ID generation module 610, as in the case of message 305. Alternatively, as in the situation where the expression metadata server generates an expression ID, the expression metadata server communications module 615 may coordinate the reception of message 315 that includes the generated expression ID.

In instances where apparatus 505-*a* is a listening UE, the expression metadata server communications module 615 coordinates the transmission or receipt of messages 220, 225, 325 and/or 330 of FIGS. 2 and/or 3. The messages transmitted through the coordination of the expression metadata server communications module 615 generally include at least a request for information from an expression metadata server. The request, as in the case of messages 220 and/or 325, may include an announcement received from the announcing UE or other data that allows for identification of the announcement or of the announcing UE. Upon receipt of the announcement or other data, the expression metadata server can identify information associated with the announcement and return the associated information to the listening UE. In the case of message 225, the returned information may include a location of the announcing UE. In the case of message 330, the returned information may include an expression ID.

In each situation, the expression metadata server communications module 615 coordinates the transmission and receipt of the communications with the expression metadata server using, for example, the receiver module 510-*a* and/or the transmitter module 520-*a*.

The hash function module 620 may be used within an apparatus 505-*a* to generate hashes based on transmitted or received public expressions. For example, an announcing UE may transmit a message 405 of FIG. 4. A listening UE may receive the transmitted message 405. Message 405 may be a public expression that includes an announcement of services available through the announcing UE. The apparatus 505-*a* may, through the hash function module 620, generate a hash from one or more portions of the message 405. The hash function module 620 may use well-known hash functions and apply these to the content of the message 405 to generate a hash that can be associated with the public expression of message 405. The use of a well-known/configured hash functions allows different UEs to generate the same hash from the message 405. In combination with the expression module 605, the hash function module 620 may incorporate its generated hash into a private expression such as message 420 (of FIG. 4), if the apparatus 505-*a* is an announcing UE, or may use the hash to associate a private expression such as message 420 with an announcing UE, if the apparatus 505-*a* is a listening UE. In the event that message 420 includes multiple hashes, the hash function module 620 may also be configured to truncate or concatenate generated hashes so that several of them can be included or identified within the message 420.

Figure 7:
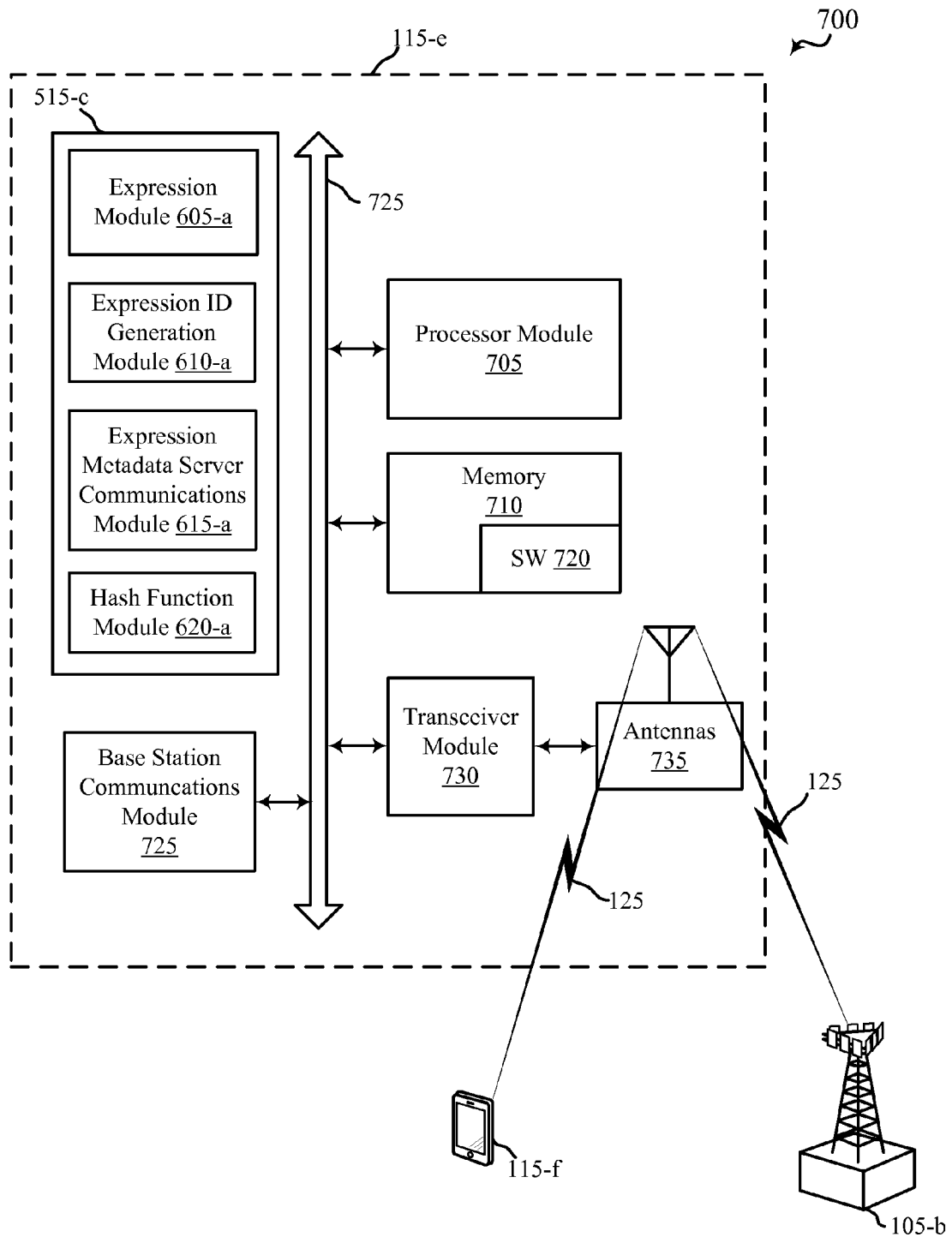
FIG. 7 is a block diagram of an example of a user device in accordance with various embodiments.

FIG. 7 shows a block diagram 700 of a UE 115-e for use in wireless communication, in accordance with various aspects of the present disclosure. The UE 115-e may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 115-e may, in some examples, have an internal power supply (not shown), such as a small battery, to facilitate mobile operation. In some examples, the UE 115-e may be an example of one or more aspects of one of the UEs 115 or apparatus 505 described with reference to FIGS. 1, 2, 3, 4, 5 and/or 6. The UE 115-e may be configured to implement at least some of the features and functions described with reference to FIGS. 1, 2, 3, 4, 5 and/or 6.

The UE 115-e may include a processor module 705, a memory module 710, at least one transceiver module 730, at least one antenna (represented by UE antennas 735), or a ProSe discovery communications module 515-c. Each of these components may be in communication with each other, directly or indirectly, over one or more buses 725. The UE 115-e may also include base station communications module 725 which may perform operations related to communications with one or more base stations.

The memory module 710 may include random access memory (RAM) or read-only memory (ROM). The memory module 710 may store computer-readable, computer-executable software (SW) code 720 containing instructions that are configured to, when executed, cause the processor module 705 to perform various functions described herein for communicating, for example, discovery-related messages. Alternatively, the software code 720 may not be directly executable by the processor module 705 but be configured to cause the UE 115-e (e.g., when compiled and executed) to perform various of the functions described herein.

The processor module 705 may include an intelligent hardware device, e.g., a CPU, a microcontroller, an ASIC, etc. The processor module 705 may process information received through the transceiver module 730 or information to be sent to the transceiver module 730 for transmission through the antenna 735. The processor module 705 may handle, alone or in connection with the ProSe discovery communications module 515-c, various aspects of transmitting, receiving and managing ProSe discovery communications.

The transceiver module 730 may include a modem configured to modulate packets and provide the modulated packets to the antennas 735 for transmission, and to demodulate packets received from the antennas 735. The transceiver module 730 may, in some examples, be implemented as one or more transmitter modules and one or more separate receiver modules. The transceiver module 730 may support discovery-related communications. The transceiver module 730 may be configured to communicate bi-directionally, via the antennas 735 and communication link 125, with, for example, base station 105-b which may be one or more of the base stations 105 described with reference to FIG. 1. The transceiver module 730 may also be configured to communicate bi-directionally, via the antennas 735 and communication link 125, with, for example, UE 115-f which may be one or more of the UEs 115 described with reference to FIGS. 1, 2, 3 and/or 4 or apparatus 505 described with reference to FIGS. 5 and/or 6. While the UE 115-e may include a single antenna, there may be examples in which the UE 115-e may include multiple UE antennas 735.

The ProSe discovery communications module 515-c may be configured to perform or control some or all of the features or functions described with reference to FIGS. 1, 2, 3, 4, 5 and/or 6 related to ProSe discovery. For example, the ProSe discovery communications module 515-c may be configured to support transmission and receipt of ProSe discovery messages as well as management of the ProSe discovery enabled by the ProSe discovery messages. In some examples, and by way of example, the ProSe discovery communications module 515-c may be an example of one or more aspects of the ProSe discovery communications module 515 described with reference to FIGS. 5 and/or 6. The ProSe discovery communications module 515-c may include an expression module 605-a (which may be an example of the expression module 605 of FIG. 6), an expression ID generation module 610-a (which may be an example of the expression ID generation module 610 of FIG. 6), an expression metadata server communications module 615-a (which may be an example of an expression ID generation module 615 of FIG. 6), and a hash function module 620-a (which may be an example of the hash function module 620 of FIG. 6). The ProSe discovery communications module 515-c, or portions of it, may include a processor, or some or all of the functions of the ProSe discovery communications module 515-c may be performed by the processor module 705 or in connection with the processor module 705. Additionally, the ProSe discovery communications module 515-c, or portions of it, may include a memory, or some or all of the functions of the ProSe discovery communications module 515-c may use the memory module 710 or be used in connection with the memory module 710.

Figure 8:
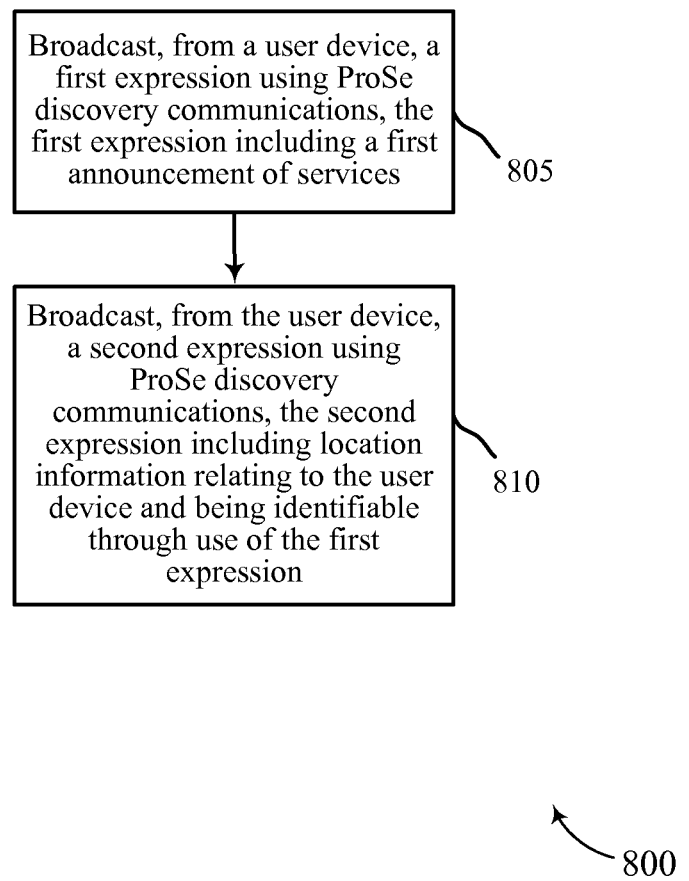
FIGS. 8-11 are flowcharts of various methods for wireless communications, in accordance with various embodiments.

FIG. 8 is a flow chart illustrating an example of a method 800 for wireless communication, in accordance with various aspects of the present disclosure. For clarity, the method 800 is described below with reference to aspects of one or more of the announcing UEs 115 described with reference to FIGS. 1, 3, 4 and/or 7, respectively, or aspects of one or more of the apparatus 505 described with reference to FIGS. 5 and/or 6. In some examples, an announcing UE such as one of the UEs 115 or an apparatus such as one of the apparatuses 505 may execute one or more sets of codes to control the functional elements of the announcing UE or apparatus to perform the functions described below.

At block 805, the method 800 may include broadcasting, from a user device, a first expression using ProSe discovery communications, the first expression including a first announcement of services. The first expression could be broadcast in the form of a message 320 and/or 405, as described above with reference to FIGS. 3 and/or 4, respectively. The first expression may be a public expression.

At block 810, the method 800 may include broadcasting, from the user device, a second expression using ProSe discovery communications, the second expression including location information relating to the user device and being identifiable through use of the first expression. For example, the second expression could be broadcast in the form of a message 335 and/or 420, as described above with reference to FIGS. 3 and/or 4, respectively. The second expression may be a private expression.

In some embodiments, the operations at blocks 805 or 810 may be performed using the ProSe discovery communications module 515 described with reference to FIGS. 5, 6 and/or 7. Nevertheless, it should be noted that the method 800 is just one implementation and that the operations of the method 800 may be rearranged or otherwise modified such that other implementations are possible.

Figure 9:
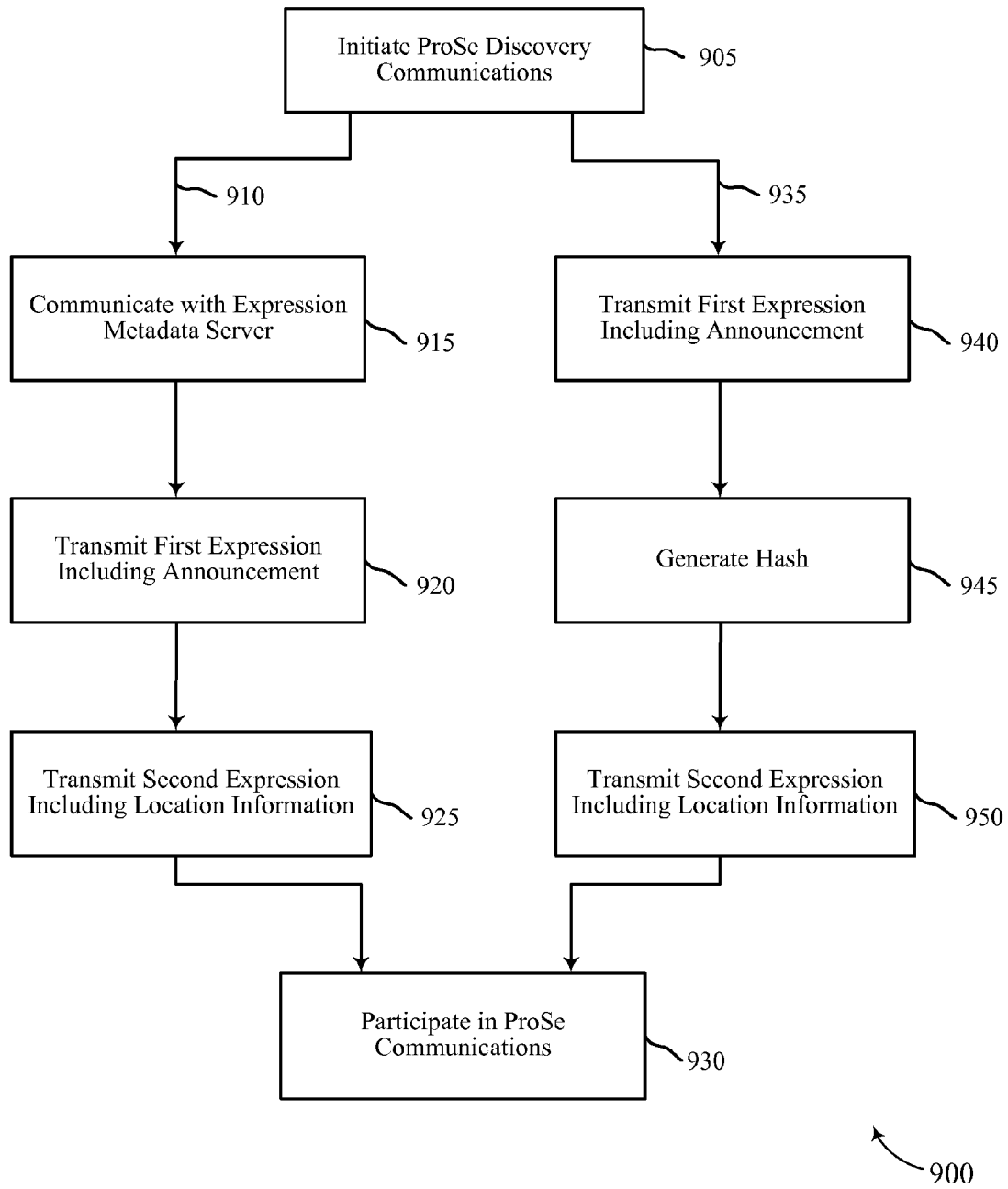

FIG. 9 is a flow chart illustrating an example of a method 900 for wireless communication, in accordance with various aspects of the present disclosure. For clarity, the method 900 is described below with reference to aspects of one or more of the announcing UEs 115 described with reference to FIGS. 1, 3, 4 and/or 7, respectively, or aspects of one or more of the apparatus 505 described with reference to FIGS. 5 and/or 6. In some examples, an announcing UE such as one of the UEs 115 or an apparatus such as one of the apparatuses 505 may execute one or more sets of codes to control the functional elements of the announcing UE or apparatus to perform the functions described below.

The method 900 illustrates two alternative flow paths represented by paths 910 and 935. At block 905, the method 900 may include initiating ProSe discovery communications. As explained above, an announcing UE may use ProSe discovery communications to provide an announcement of offered services to other listening UEs. In addition to providing an announcement of services, the announcing UE may also provide location information for the announcing UE to the listening UEs. This may be done using one of flow paths 910, 935.

Following flow path 910, at block 915, the method 900 may comprise communicating with an expression metadata server. An announcing UE may communicate with an expression metadata server in order to either convey to the expression metadata server or obtain from the expression metadata server an expression ID that may be used to identify a subsequently broadcast expression, such as a private expression. For example, an announcing UE may convey a message 305 (as described in connection with FIG. 3) to an expression metadata server, wherein the message 305 includes a generated expression ID. The expression metadata server may then store the received expression ID and associate it with either the announcing UE and/or an announcement from the announcing UE. Alternatively, an announcing UE may communicate with an expression metadata server in order to receive an expression ID generated by the expression metadata server, such as via message 315, described with reference to FIG. 3. In this case, the expression metadata server still stores the generated expression ID and associates the expression ID with either the announcing UE and/or an announcement to be broadcast by the announcing UE.

At block 920, the method 900 may include transmitting a first expression, wherein the first expression includes an announcement from the announcing UE. The announcement may be an announcement of services offered by the announcing UE. The first expression may also include an identification of the announcing UE, for example. The first expression may be in a form of a public expression. Examples of the first expression include message 320, as described above in relation to FIG. 3.

At block 925, the method 900 may include a step of transmitting a second expression that includes location information for the announcing UE. The first and the second expressions may be broadcast at approximately the same time. The second expression may also include the expression ID generated in connection with the communications between the announcing UE and the expression metadata server, described with relation to block 915. In an embodiment, the expression ID may be included within the second expression as a prefix, while the location information may be included within the second expression as a suffix. Other configurations may also be used. The second expression may be a private expression. Examples of the second expression include message 335, as described above in relation to FIG. 3.

After the announcing UE has exchanged its first and second expressions with one or more listening UEs, the announcing UE may participate in other ProSe communications with the one or more listening UEs (as depicted at block 930). Examples of ProSe communications between an announcing UE and one or more listening UEs are illustrated through communications 340 of FIG. 3, as described above.

If an alternative path for transmitting the location of an announcing UE to one or more listening UEs is used, such as path 935, method 900 includes a block 940. At block 940, method 900 includes transmitting a first expression, wherein the first expression includes an announcement of services offered by the announcing UE. The first expression may also include an identification of the announcing UE, for example. The first expression may be in a form of a public expression. Examples of the first expression include message 405, as described above in relation to FIG. 4.

At block 945, the announcing UE generates a hash of one or more portions of the first expression. The hash is generated using a well-known hash function. In this way, a listening UE that has received the first expression can also generate the same hash by using the same, well-known hash function. The announcing UE may, if needed, truncate the hash in order to reduce its size. Examples of an announcing UE using a hash value include the function described in relation to box 410 of FIG. 4.

At block 950, the announcing UE transmits a second expression. The second expression may include location information for the announcing UE. The second expression may also include the hash generated by the announcing UE. In an embodiment, the hash may be included within the second expression as a prefix, while the location information may be included within the second expression as a suffix. Additionally, multiple hashes associated with the same announcing UE (but with different announcements and/or first expressions) may be included within the same prefix. When multiple hashes are included within the second expression, the hashes may need to be truncated or concatenated in order to reduce the total size of the hashes. Other prefix and suffix configurations may also be used. The second expression may be a private expression. Examples of the second expression include message 420, as described above in relation to FIG. 4.

After the listening UE has received first and second expressions from an announcing UE, the listening UE may participate in other ProSe communications with the announcing UE (as depicted at block 930). Examples of ProSe communications between an announcing UE and one or more listening UEs are illustrated through communications 425 of FIG. 4, as described above.

It should be noted that the method 900 is just one implementation and that the operations of the method 900 may be rearranged or otherwise modified such that other implementations are possible. As a specific example, not every operation illustrated in m the method 900 need be performed, and many operations may be performed in different orders than those illustrated in FIG. 9.

Figure 10:
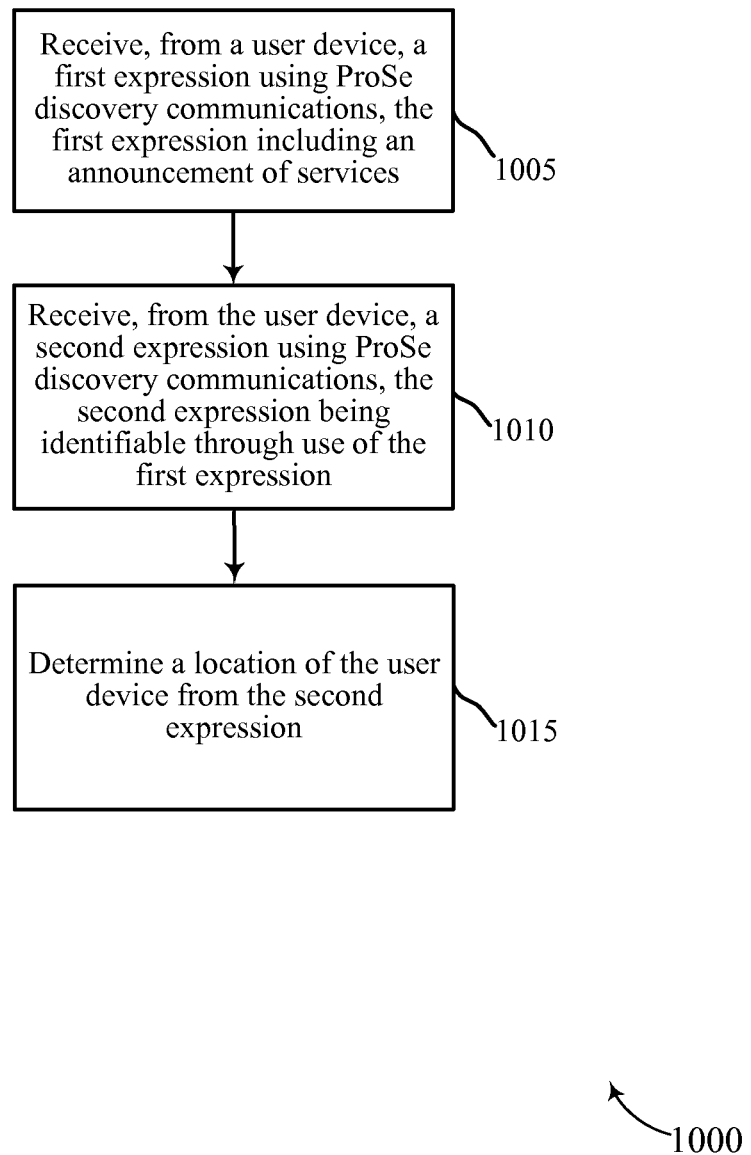

FIG. 10 is a flow chart illustrating an example of a method 1000 for wireless communication, in accordance with various aspects of the present disclosure. For clarity, the method 1000 is described below with reference to aspects of one or more of the listening UEs 115 described with reference to FIGS. 1, 3, 4 and/or 7, respectively, or aspects of one or more of the apparatus 505 described with reference to FIGS. 5 and/or 6. In some examples, a listening UE such as one of the UEs 115 or an apparatus such as one of the apparatuses 505 may execute one or more sets of codes to control the functional elements of the listening UE or apparatus to perform the functions described below.

At block 1005, the method 1000 may include receiving, from a user device, a first expression using ProSe discovery communications, the first expression including a first announcement of services. The first expression could be received in the form of a message 320 and/or 405, as described above with reference to FIGS. 3 and/or 4, respectively. The first expression may be a public expression.

At block 1010, the method 1000 may include receiving, from the user device, a second expression using ProSe discovery communications, the second expression being identifiable through use of the first expression. For example, the second expression could be received in the form of a message 335 and/or 420, as described above with reference to FIGS. 3 and/or 4, respectively. The second expression may be a private expression. The first and the second expression may be received in any order.

At block 1015, the method 1000 may include determining a location of the user device from the second expression. The second expression may include the location information of the user device.

In some embodiments, the operations at blocks 1005, 1010 or 1015 may be performed using the ProSe discovery communications module 515 described with reference to FIGS. 5, 6 and/or 7. Nevertheless, it should be noted that the method 1000 is just one implementation and that the operations of the method 1000 may be rearranged or otherwise modified such that other implementations are possible.

Figure 11:
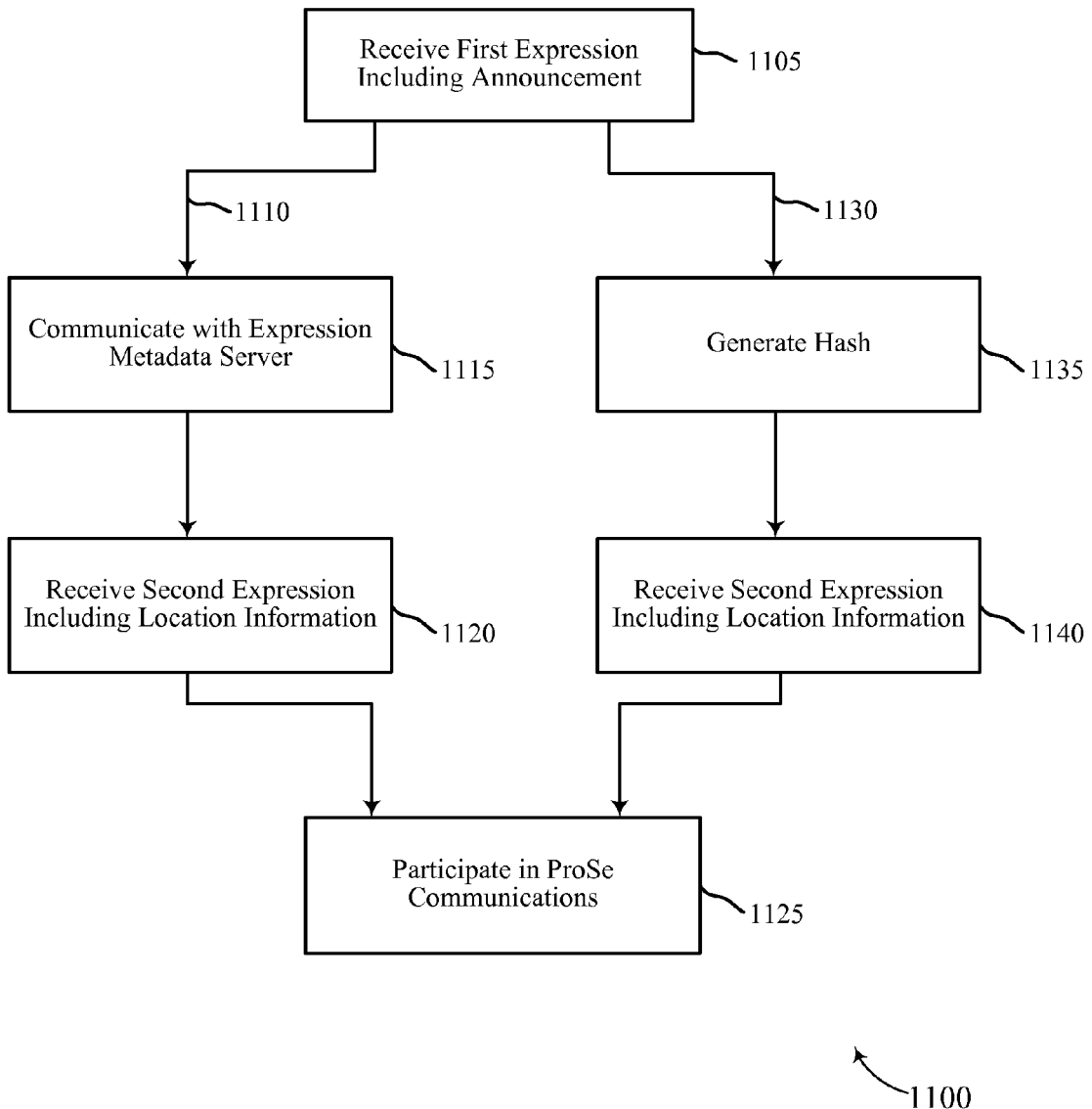

FIG. 11 is a flow chart illustrating an example of a method 1100 for wireless communication, in accordance with various aspects of the present disclosure. For clarity, the method 1100 is described below with reference to aspects of one or more of the listening UEs 115 described with reference to FIGS. 1, 3, 4 and/or 7, respectively, or aspects of one or more of the apparatus 505 described with reference to FIGS. 5 and/or 6. In some examples, a listening UE such as one of the UEs 115 or an apparatus such as one of the apparatuses 505 may execute one or more sets of codes to control the functional elements of the listening UE or apparatus to perform the functions described below.

The method 1100 illustrates two alternative flow paths represented by paths 1110 and 1130. At block 1105, the method 1100 may include receiving a first expression. The first expression may be received as a message broadcast by an announcing UE engaging in ProSe discovery communications. Thus, the first expression may include an announcement of services available through the announcing UE. The first expression may also include an identification of the announcing UE, for example. The first expression may be in a form of a public expression. Examples of the first expression include message 320, as described above in relation to FIG. 3.

In receiving the announcement of services via the first expression, the listening UE may additionally benefit from receiving location information for the announcing UE to the listening UEs. This may be done using one of flow paths 1110, 1130.

Following flow path 1110, at block 1115, the method 1100 may comprise communicating with an expression metadata server. A listening UE may communicate with an expression metadata server in order to obtain an expression ID that can allow the listening UE to identify a second expression broadcast by the announcing UE. For example, the listening UE may transmit a request message 325 (as described in connection with FIG. 3) to an expression metadata server. The request message 325 may include the announcement or other data that allows for identification of, for example, the announcing UE or the announcement received via the first expression. The expression metadata server thus receives the identification, which it has already associated with a previously generated expression ID. Thus, the expression metadata server is able to respond to the listening UE's request message 325 by returning the expression ID to the listening UE via message 330.

At block 1120, the method 1100 may include a step of receiving a second expression that includes location information for the announcing UE. The second expression may also include the expression ID received from the expression metadata server. In an embodiment, the expression ID may be included within the second expression as a prefix, while the location information may be included within the second expression as a suffix. Other configurations may also be used. The second expression may be a private expression. Examples of the second expression include message 335, as described above in relation to FIG. 3. The first and second expressions may be received in any order.

In this way, the listening UE is able to obtain the location information for the announcing UE. The listening UE and the announcing UE may then participate in other ProSe communications (as depicted at block 1125). Examples of ProSe communications between an announcing UE and a listening UE are illustrated through communications 340 of FIG. 3, as described above.

If an alternative path for receiving the location of an announcing UE is used, such as path 1130, method 1100 includes a block 1135. At block 1135, method 1100 includes generating a hash of one or more portions of the first expression received by the listening UE. The hash is generated using a well-known hash function that may have also been used by the announcing UE to generate the same hash. The listening UE may also, if needed, truncate the hash. The purpose of generating a hash and truncating the same is to derive an identifier that may be used to identify a second expression as having been sent by the same announcing UE. Examples of a listening UE generating a hash function include the function described in relation to box 415 of FIG. 4.

At block 1140, the listening UE receives a second expression. The second expression may include location information for the announcing UE. The second expression may also include the hash generated by the listening UE. In an embodiment, the hash may be included within the second expression as a prefix, while the location information may be included within the second expression as a suffix. Additionally, multiple hashes associated with the same announcing UE (but with different announcements and/or first expressions) may be included within the same prefix. When multiple hashes are included within the second expression, the hashes may need to be truncated in order to reduce the size of the hashes. Thus, the listening UE may use either the hash it previously generated or a truncated version of the hash in order to identify the second expression. Other prefix and suffix configurations may also be used. The second expression may be a private expression. Examples of the second expression include message 420, as described above in relation to FIG. 4. The first and second expressions may be received in any order.

After the listening UE has received both first and second expressions from an announcing UE, the listening UE may participate in other ProSe communications with the announcing UE (as depicted at block 1125). Examples of ProSe communications between a listening UE and an announcing UE are illustrated through communications 425 of FIG. 4, as described above.

It should be noted that the method 1100 is just one implementation and that the operations of the method 1100 may be rearranged or otherwise modified such that other implementations are possible. As a specific example, not every operation illustrated in m the method 1100 need be performed, and many operations may be performed in different orders than those illustrated in FIG. 11.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS. LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
broadcasting, from a transmitter of a user device, a first message that comprises a first expression using proximity services (ProSe) discovery communications, the first expression including a first announcement of services, and
broadcasting, from the transmitter of the user device, a second message that comprises a second expression using ProSe discovery communications, the second expression including location information relating to the user device and being identifiable through use of the first expression, wherein the first expression and the second expression are different.

2. The method of claim 1, wherein the first expression is a public expression and the second expression is a private expression.

3. The method of claim 1, wherein the second expression is selectively broadcast based at least in part on an amount of movement of the user device.

4. The method of claim 3, further comprising:
transmitting the location information to an expression metadata server for association with the first announcement if the amount of movement of the user device is below a predetermined threshold.

5. The method of claim 1, further comprising:
including an identifier in the second expression, the identifier relating to the first announcement.

6. The method of claim 5, further comprising:
generating the identifier; and
transmitting the identifier to an expression metadata server for association with the first announcement.

7. The method of claim 5, further comprising:
transmitting a request to an expression metadata server to generate the identifier and to associate the identifier with the first announcement.

8. The method of claim 5, wherein the identifier is included in a first portion of the second expression and the location information is included in a second portion of the second expression.

9. The method of claim 1, further comprising:
generating a first hash of one or more portions of the first expression; and
including the first hash in the second expression.

10. The method of claim 9, wherein the first hash is included in a first portion of the second expression, and the location information is included in a second portion of the second expression.

11. The method of claim 9, further comprising:
broadcasting, from the user device, a third expression using ProSe discovery communications, the third expression including a second announcement of services;
generating a second hash of one or more portions of the third expression; and
including the second hash in the second expression.

12. The method of claim 11, wherein the first and the second hash are included in a first portion of the second expression, and the location information is included in a second portion of the second expression.

13. The method of claim 11, further comprising:
truncating at least one of the first and second hashes.

14. An apparatus for wireless communication, comprising:
means for broadcasting, from a transmitter of a user device, a first message that comprises a first expression using proximity services (ProSe) discovery communications, the first expression including a first announcement of services, and
means for broadcasting, from the transmitter of the user device, a second message that comprises a second expression using ProSe discovery communications, the second expression including location information relating to the user device and being identifiable through use of the first expression, wherein the first expression and the second expression are different.

15. The apparatus of claim 14, wherein the first expression is a public expression and the second expression is a private expression.

16. The apparatus of claim 14, further comprising:
means for including an identifier in the second expression, the identifier relating to the first announcement.

17. The apparatus of claim 16, further comprising:
means for generating the identifier; and
means for transmitting the identifier to an expression metadata server for association with the first announcement.

18. The apparatus of claim 16, further comprising:
means for transmitting a request to an expression metadata server to generate the identifier and to associate the identifier with the first announcement.

19. The apparatus of claim 16, wherein the identifier is included as a prefix in the second expression and the location information is included as a suffix in the second expression.

20. The apparatus of claim 14, further comprising:
means for generating a first hash of one or more portions of the first expression; and
means for including the first hash in the second expression.

21. The apparatus of claim 20, wherein the first hash is included in a first portion of the second expression, and the location information is included in a second portion of the second expression.

22. The apparatus of claim 20, further comprising:
means for broadcasting, from the user device, a third expression using ProSe discovery communications, the third expression including a second announcement of services;
means for generating a second hash of one or more portions of the third expression; and
means for including the second hash in the second expression.

23. The apparatus of claim 22, wherein the first and the second hash are included in a first portion of the second expression, and the location information is included in a second portion of the second expression.

24. An apparatus configured for wireless communication, comprising:
at least one processor; and
a memory coupled to the at least one processor, wherein the at least one processor is configured:
to broadcast, from a transmitter of a user device, a first message that comprises a first expression using proximity services (ProSe) discovery communications, the first expression including a first announcement of services, and to broadcast, from the transmitter of the user device, a second message that comprises a second expression using ProSe discovery communications, the second expression including location information relating to the user device and being identifiable through use of the first expression, wherein the first expression and the second expression are different.

25. A method of wireless communication, comprising:
receiving, from a transmitter of a user device, a first message comprising a first expression using proximity services (ProSe) discovery communications, the first expression including an announcement of services;
receiving, from the transmitter of the user device, a second message comprising a second expression using ProSe discovery communications, the second expression being identifiable through use of the first expression; and
determining a location of the user device from the second expression, wherein the first expression and the second expression are different.

26. The method of claim 25, further comprising:
communicating with an expression metadata server to receive an identifier associated with the announcement; and
associating the second expression with the first expression by identifying the identifier as a portion of the second expression.

27. The method of claim 26, wherein the identifier is included in a first portion of the second expression and the location of the user device is included in a second portion of the second expression.

28. The method of claim 25, further comprising:
generating a hash of one or more portions of the first expression; and
associating the second expression with the first expression by identifying the hash as a portion of the second expression.

29. The method of claim 28, wherein the hash is included in a first portion of the second expression, and the location of the user device is included in a second portion of the second expression.

30. The method of claim 28, further comprising:
truncating the hash, wherein the second expression is associated with the first expression by identifying the truncated hash as a portion of the second expression.

* * * * *